United States Patent
van Dyk et al.

(10) Patent No.: US 9,627,865 B2
(45) Date of Patent: Apr. 18, 2017

(54) TRANSMISSION STATION FOR FEEDING IN ELECTRICAL ENERGY AND WIND FARM COMPRISING SUCH TRANSMISSION STATION

(71) Applicant: Wobben Properties GmbH, Aurich (DE)

(72) Inventors: Holger van Dyk, Ihlow (DE); Heinz Flessner, Ihlow (DE)

(73) Assignee: Wobben Properties GmbH, Aurich (DE)

( * ) Notice: Subject to any disclaimer, the term of this patent is extended or adjusted under 35 U.S.C. 154(b) by 141 days.

(21) Appl. No.: 14/443,981

(22) PCT Filed: Nov. 19, 2013

(86) PCT No.: PCT/EP2013/074126
§ 371 (c)(1),
(2) Date: May 19, 2015

(87) PCT Pub. No.: WO2014/079824
PCT Pub. Date: May 30, 2014

(65) Prior Publication Data
US 2015/0303662 A1   Oct. 22, 2015

(30) Foreign Application Priority Data

Nov. 23, 2012   (DE) .................. 10 2012 221 498

(51) Int. Cl.
*H02B 13/025* (2006.01)
*E04B 1/94* (2006.01)
(Continued)

(52) U.S. Cl.
CPC .............. *H02B 13/025* (2013.01); *E04H 5/04* (2013.01); *F03D 7/048* (2013.01); *F03D 9/005* (2013.01);
(Continued)

(58) Field of Classification Search
CPC ... H02B 7/06; H02B 1/06; H02B 1/56; H02B 13/025; H02B 7/00–7/08; E04H 5/04;
(Continued)

(56) References Cited

U.S. PATENT DOCUMENTS 2,943,717 A    7/1960   Latzko
7,677,869 B2   3/2010   Martinez De Lizarduy Romo et al.
(Continued)

FOREIGN PATENT DOCUMENTS

CN    1553995 A    12/2004
CN    101457682 A    6/2009
(Continued)

OTHER PUBLICATIONS

Press Release, "Fire in Spremberger substation without sequelae," 2010, retrieved from http://www.wsb-service.de/uploads/tx_ivpresse/2010-11-05_Presseinformation-Wandlerschaden-UW_Spremberg_01.pdf, on Sep. 20, 2013, 2 pages. (with Machine Translation).

(Continued)

*Primary Examiner* — Zachary M Pape
(74) *Attorney, Agent, or Firm* — Seed IP Law Group LLP

(57) ABSTRACT

The invention relates to a transmission station for feeding locally provided electrical energy, in particular provided by one or more wind power installations, into a grid. According to the invention, it is proposed for a housing of the transmission station to feature a first, accessible room and a second room that is connected to the outside world by means of an exhaust pipe, with such first room and second room being connected to each other by means of a joint recess, with such control unit closing the joint recess, and with one casing of the control unit being open in the area where the recess is closed and/or showing a predetermined breaking point that is adapted to fail if an electric arc occurs inside the control unit.

19 Claims, 2 Drawing Sheets

(51) Int. Cl.
  *H01H 33/53* (2006.01)
  *F03D 7/04* (2006.01)
  *F03D 9/00* (2016.01)
  *E04H 5/04* (2006.01)
  *H02B 7/06* (2006.01)
  *H02B 1/56* (2006.01)

(52) U.S. Cl.
  CPC .............. *H02B 1/56* (2013.01); *H02B 7/06* (2013.01); *E04B 1/94* (2013.01); *H01H 33/53* (2013.01)

(58) Field of Classification Search
  CPC ......... F03D 7/048; F03D 9/005; G05B 15/02; H02J 3/00; H01H 33/53; E04B 1/94
  USPC ................................................ 361/602–604
  See application file for complete search history.

(56) References Cited

U.S. PATENT DOCUMENTS

| | | | |
|---|---|---|---|
| 7,786,612 B2 | 8/2010 | Wobben | |
| 8,984,862 B2 | 3/2015 | Overhoff et al. | |
| 9,297,362 B2 * | 3/2016 | Becker | ................... F03D 11/00 |

FOREIGN PATENT DOCUMENTS

| | | | | |
|---|---|---|---|---|
| CN | 101771244 A | 7/2010 | | |
| DE | 26 26 186 A1 | 12/1977 | | |
| DE | 30 14 483 A1 | 10/1981 | | |
| DE | 9213806 U1 * | 5/1993 | ............... | E04H 5/04 |
| DE | 4307478 A1 | 9/1993 | | |
| DE | 42 10 901 A1 | 10/1993 | | |
| DE | 100 09 013 A1 | 9/2000 | | |
| DE | 102009013089 A1 | 11/2010 | | |
| DE | 10 2010 056 456 A1 | 6/2012 | | |
| EP | 1531376 A1 | 5/2005 | | |
| JP | 58177682 U1 | 11/1983 | | |
| JP | 531205 A | 2/1993 | | |
| JP | 201189327 A | 5/2011 | | |
| KR | 1020120035450 A | 4/2012 | | |
| RU | 2173280 C2 | 9/2001 | | |
| RU | 2187858 C1 | 8/2002 | | |

OTHER PUBLICATIONS

Neumann et al., Weiterer Ausbau der Windenergienutzung im Hinblick auf den Klimaschutz—Teil 2, End-bericht, Deutsches Windenergie-Institut GmbH, Nov. 2002, S. 1-4, pp. 71-84, retrieved from http://www.erneuerbare-energien.de/fileadmin/ee-import/files/pdfs/allgemein/application/pdf/windenergie_studie02.pdf, on Sep. 20, 2013, 107 pages. (with Machine Translation of pp. 71-75 Only).

* cited by examiner

TRANSMISSION STATION FOR FEEDING IN ELECTRICAL ENERGY AND WIND FARM COMPRISING SUCH TRANSMISSION STATION

BACKGROUND

Technical Field

The present invention relates to a transmission station for feeding locally provided electrical energy and, in particular, electrical energy provided by one or more wind power installations into a grid. The invention further relates to a wind farm comprising one or more such transmission stations.

Description of the Related Art

Wind power installations are increasingly used to provide electrical energy. The rotational movement of the rotors that is produced by wind power is transformed to AC voltage by means of generators, and is then discharged from the wind power installation and ultimately fed into a public utilities network, hereinafter also referred to as grid. For feed-in purposes, the voltage produced by the wind power installation is brought to the required form by means of various controls. This mostly requires the use of inverters and/or rectifiers and of one or more transformers. These intermediate steps are taken either at the wind power installation itself or at corresponding control installations that are external to the wind power installation. If controls that are external to the wind power installation as well as further infrastructure for feed-in purposes should be required, such required controls are accommodated in housings to, on the one hand, offer protection from external influences and, on the other, to protect the environment from damages caused by voltage. Housings that accommodate the connection to the grid are referred to as transmission stations in the industry.

In such transmission stations, control units are provided for to ensure that the voltage delivered to a transmission station is provided such that it can be fed into the grid via a line connection that belongs to the grid. Whether or not this requires voltage direction and/or transformation inside the transmission station depends on the wind power installations used from time to time and possibly on interconnected further stations.

Because of the high voltages and/or currents present at such transmission stations that occasionally collect the electrical energy provided by several wind power installations and process it for feed-in purposes, there is a risk of short-circuits in the control units. In extreme cases, this may lead to the formation of electric arcs inside the control units, which then lead to a gas explosion inside the transmission station that is accompanied by the propagation of a blast wave and heavy smoke formation. This is a major health risk especially for those who are present at the transmission station at the time of formation of an electric arc.

Various arrangements are described in prior art, whose goal it is to remove as quickly as possible the smoke that has formed at such places inside a transmission station, where people might be located. However, general plant safety still needs to be improved at such transmission stations.

Given the ever increasing sale of wind power installations and an increasingly local organization of power generation because of the growing share of regenerative energy, there is, in particular, an additional duty to ensure the improvement of safety at transmission stations in an economically efficient manner.

BRIEF SUMMARY

One or more embodiments of the invention are directed to a transmission station that offers better protection for people against the effects of electric arcs inside a transmission station in an economically efficient way.

One or more embodiments may solve the underlying problem by providing a transmission station of the type mentioned at the beginning, which includes a line connection belonging to the grid, a control unit that is configured to regulate feed-in (for example, by transforming) of the locally provided electrical energy and feeding in the transformed electrical energy to by means of the line connection connecting to the grid), and a lockable housing, which may be weather-proof, and within which the line connections, fasteners and control unit are arranged. The housing may include a first, accessible room and a second room that is connected to an outside environment by means of an exhaust pipe. The first and second room may be connected to each other by means of a joint recess with the control unit closing the joint recess, and with one casing of the control unit being open in an area where the recess is closed and/or showing a predetermined breaking point that is adapted to fail if an electric arc occurs inside the control unit.

Protecting the persons located inside the transmission station from exposure to the blast wave and smoke formation may be best achieved when the area where persons may be located is exposed as little as possible to such a blast wave and, especially, to the smoke that will form. Instead of trying to discharge the blast wave and smoke from the area where persons are located as quickly as possible, one or more embodiments described herein prevent the blast wave from spreading and smoke from forming in the room where persons may be located. At least one embodiment provides placing the control unit in the transmission station in the above-described manner above a through-hole leading to a second room, with the control unit being designed such that the electric arc forming inside the control unit and the accompanying blast wave will follow the path of least resistance and spread through the joint recess and into the second room, where no persons are located. Since such second room is connected to an exhaust pipe, the blast wave and smoke that has formed can be discharged from the housing through such exhaust pipe. Compared to already known solutions, this will clearly reduce the exposure to smoke and pressure for persons possibly located in the first room.

Preferably, the exhaust pipe includes a down pipe that is actively connected to a backlash element, with the backlash element being configured to release the down pipe in case of overpressure in the second room. Here, overpressure means the adjacent air pressure outside the housing in the second room that is relative to the ambient pressure.

Preferably, the backlash element can be moved back and forth between a locked position and a released position. Further preferably, the backlash element is in a normally closed position (NC)—the so-called locked position—and can be moved from locked to released position by means of the overpressure in the second room, once a critical pressure value has been reached, and automatically back to the locked position due to the force of gravity and/or by means of a return means, once the pressure falls below a critical value. A pull-spring may be used as additional return means provided in support of gravity and to increase the critical pressure value, as of which triggering takes place.

According to one or more embodiments, the second room is arranged underneath the first room, from which it is separated by a joint wall. The wall means a floor or ceiling element, such as a joint floor or ceiling panel. According to this embodiment, already established room layout concepts may not be abandoned. Preferably, the connection line belonging to the grid is laid in the "basement" of the transmission station, i.e., into the second room. When the transmission station is installed and recessed in the ground, at least parts of the second room are preferably in the ground as well. In this embodiment, the otherwise unused cavity underneath the first room in the transmission station now has the additional function of serving as an extension of the exhaust pipe.

According to yet another preferred embodiment of the transmission station, the exhaust pipe extends from the second room into the first room through a lead-through opening and across the first room, and it leaves the first room through a side or ceiling wall of the housing.

Because the exhaust pipe is laid completely within the housing all the way to the point where it leaves the housing, it is better protected from external influences. This also allows for checking on the condition of the seal faces inside the transmission station. Another advantage is that the outside dimensions of the transmission station are not raised any further by add-on parts, such as externally laid exhaust pipes.

According to yet another preferred embodiment, the exhaust pipe is inserted through the lead-through opening of the second room and into the first room by means of a flange, which may be a divisible flange. The flange may show two halves, each one comprising half of the exhaust pipe. Designing a flange as a divisible flange has the advantage that it is more easily detachable from the exhaust pipe, for example in case of maintenance or if the exhaust pipe needs to be replaced. Another advantage of a flange that can be replaced in such a manner is that the housing of the transmission station can be designed uniformly. The same floor slabs, which separate the first room from the second room, can be used for switchboards of any size. Depending on the size of the control installations, the exhaust pipe, which runs across the first room as a down pipe, must have different diameters. However, by selecting an adequate flange, exhaust pipes may have different diameters for the same floor slab by accordingly adapting the flange to the exhaust pipe, on the one hand, and to the size of the lead-through opening, on the other.

According to a second aspect, the invention is directed to a wind farm. The wind farm has one or more wind power installations for the provision of electrical energy and one or more transmission stations that are connected to the one or more wind power installations by means of electrical lines. At least one of the several transmission stations of the wind farm may be designed according to one or more embodiments described herein.

BRIEF DESCRIPTION OF THE SEVERAL VIEWS OF THE DRAWINGS

The invention is described in more detail below based on preferred embodiments, with reference to the attached figures. The figures show the following.

DETAILED DESCRIPTION

Figure 1:
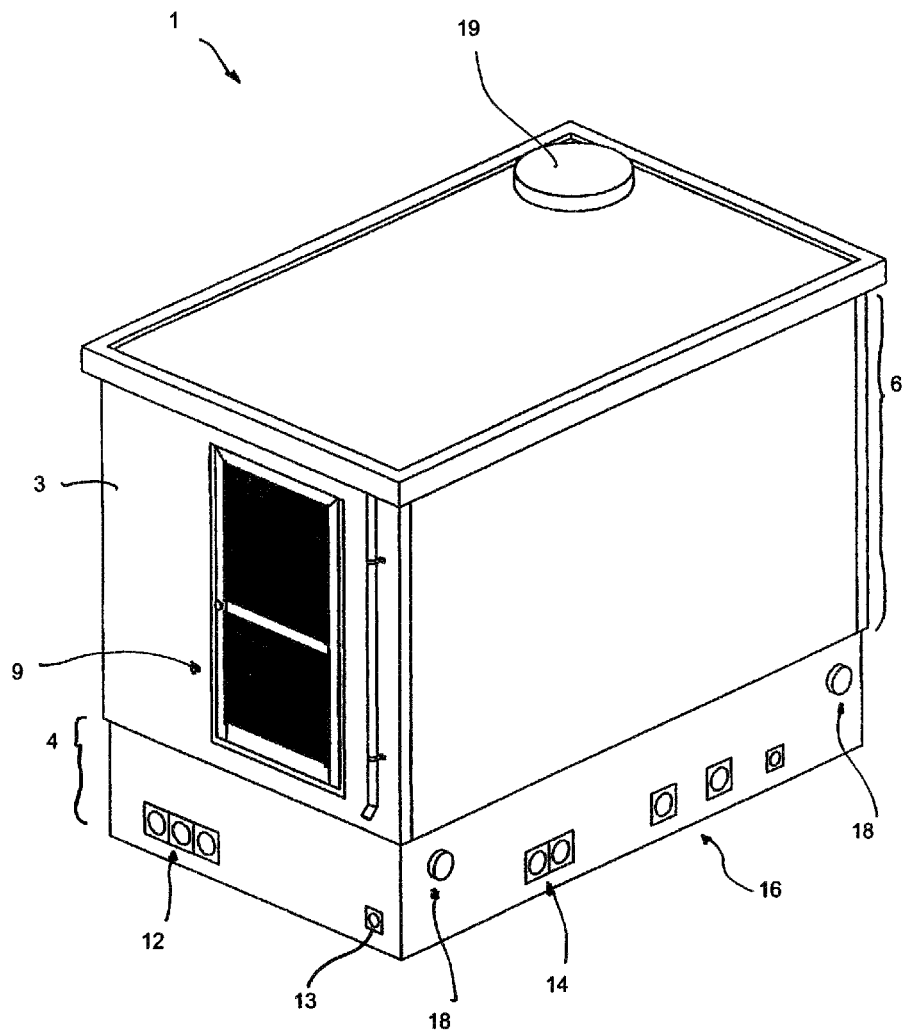
FIG. 1 shows the schematic spatial illustration of a transmission station according to an exemplary embodiment.
Figure 2:
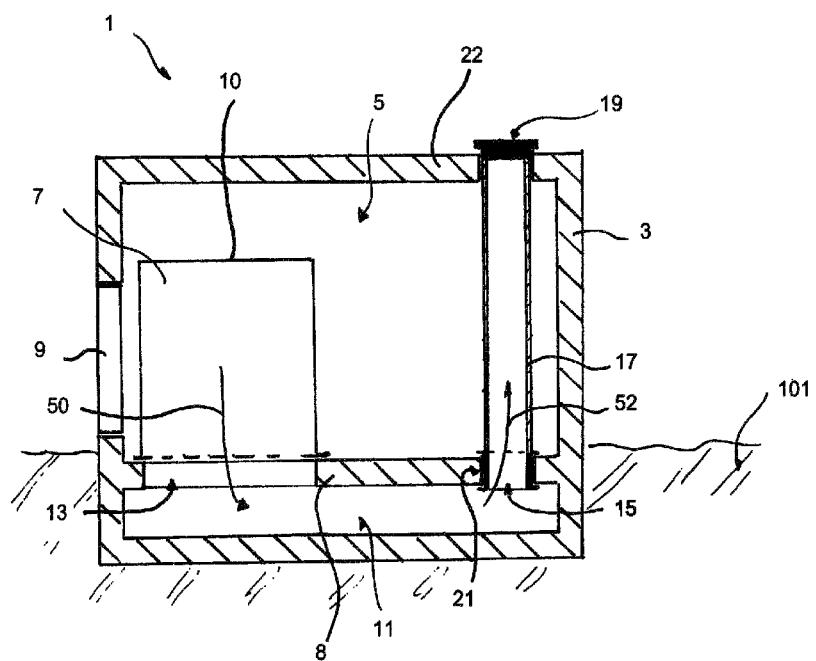
FIG. 2 shows a schematic cross-section of the transmission station according to FIG. 1.

FIG. 1 shows a transmission station 1 according to a preferred exemplary embodiment of the invention. FIG. 2 shows a schematic cross-section of such a transmission station. Transmission station 1 shows a housing 3, which features a base-plate area 4 that is to be embedded in the ground and a superstructure 6 that is to remain above ground. A lockable door 9 is provided for in superstructure 6. A plurality of cable ducts 12, 14 and 16 are provided for in base-plate area 4. Cable ducts 12, 14, 16 serve preferably as cable inlets. A grounding point 13 is arranged in yet another area of base-plate 4, in a corner area of FIG. 1. The transmission station features attachment points 18 at each of its four corners, which are arranged in pairs on the opposite side and serve to apply lifting gear. Two of these attachment points are shown in FIG. 1. They are not shown in FIG. 2 for reasons of clarity.

A control unit 7, which is shown exemplary as a switch cabinet, is arranged inside transmission station 1. Preferably, control unit 7 features a casing 10 and therein one or more switchboards and/or measuring fields. It is arranged on a floor slab 8. A first recess 13 is provided for in floor slab 8, which separates a first room 5 from a second room 11. Control unit 7 is arranged on, and directly conterminous to, recess 13. The second room 11 is separated from the first room 5 by closing recess 13 by means of control unit 7.

In addition, floor slab 8 features a lead-through opening 15. A down pipe 17 is inserted in lead-through opening 15, which extends through lead-through opening 15 and downwards into the second room 11 and is led out of the first room 5 through a ceiling wall 22. An alternative preferred embodiment provides for the down pipe to be led out through a side wall. The exhaust pipe, which is formed by down pipe 17, is attached to floor slab 8 of transmission station 1 by means of a flange 21. Flange 21 is set in concrete in floor slab 8 and is designed preferably as a steel flange. Preferably, down pipe 17 features a correspondingly designed collar for optimum fastening to flange 21, which collar can be coupled to flange 21 with common flange coupling means. A backlash element 19 is arranged as a flap at an upper end of down pipe 17 in FIG. 2. The flap is kept in the depicted closed position thanks to the force of gravity, optionally also supported by one or more return elements, such as springs. In this position, the exhaust pipe is closed and blocked.

Transmission station 1 according to FIG. 2 is embedded in the surrounding ground 101, so that the connection cables belonging to the grid can be laid directly into second room 11, while the first room 5 remains accessible from the outside through door 9.

If an electric arc develops, for example as a result of switching defects, it will spread from the control unit—its point of origin—towards the path of least resistance. As the walls of casing 10 of control unit 7 are designed to provide sufficient stability in such incidents, the electric arc and the developing blast wave (due to gas ignition) will spread downwards, since control unit 7 is essentially open at the bottom—as indicated by the dashed line—or, respectively, has a predetermined failure point, which will give way if the pressure should rise within control unit 7. In the event of such an incident, the electric arc and blast wave and the smoke that develops at the same time will initially spread downwards in the direction of arrow 50. The first room 5 will remain mostly unaffected by the blast wave and, in particular, by the developing smoke, apart from minor amounts of smoke that will enter the first room 5 through potentially leaky spots in control unit 7. Such smoke will be pushed into the second room 11 and will then spread through the exhaust pipe, in particular through down pipe 17, and in the direction of arrow 52. If a specific, predictable pressure threshold is exceeded, flap 19 will release the exhaust pipe, and both smoke and overpressure will leave housing 3 and discharge into the environment outside. After release from the locked position, as shown in FIG. 2, towards a released position, the pressure inside transmission station 1 will drop quickly below the critical threshold, which will make flap 19 return to its original locked position. This will mostly protect the inside of transmission station 1 from external influences. At the same time, most of the dangerous smoke will be released.

With the above-described embodiment, the invention provides a means for improving plant safety. Room 5 inside the transmission station 1 becomes a safer place because of the targeted discharge of the electric arc into the second room 11. Because the first room 5 can be considered essentially blast wave free even in the event of an incident after it has been ensured that the fault arc is discharged, the exposure due to an electric arc, which puts at risk especially those who are located inside of first room 5, is reduced significantly.

The invention claimed is:

1. A transmission station for feeding, into a grid, electrical energy generated by a wind power installation the transmission station comprising:
   a line connection connected to the grid,
   a control unit having a casing and configured to regulate feeding of the electrical energy, and
   a lockable housing that houses the line connection, fasteners and the control unit, wherein:
      the housing includes a first room and a second room, the second room having a lead-through opening and being connected to an outside environment by an exhaust pipe that is led through the lead-through opening by a flange,
      the first room and the second room are connected to each other by a joint recess,
      the control unit closes the joint recess, and
      the casing of the control unit having at least one of an opening that is open in an area where the recess is closed and a predetermined breaking point that is adapted to fail when an electric arc occurs inside the control unit.

2. The transmission station according to claim 1, wherein the exhaust pipe is formed by a down pipe with a backlash element, wherein the backlash element is configured to release the down pipe in case of overpressure in the second room.

3. The transmission station according to claim 2, wherein the backlash element is movable back and forth between a locked position and a released position.

4. The transmission station according to claim 2, wherein the backlash element is movable from a locked position to a released position in response to a pressure value being above a threshold value and back to the locked position in response to the pressure value being below the threshold valued.

5. The transmission station according to claim 2, wherein the second room is disposed underneath the first room and separated from the first room by a joint wall.

6. The transmission station according to claim 1, wherein the exhaust pipe extends from the second room into the first room through the lead-through opening and the exhaust pipe extends across the first room leaving the first room through a side or ceiling wall of the housing.

7. A wind farm comprising:
   one or more wind power installations for generating electrical energy, and
   one or more transmission stations that are connected to the one or more wind power installations by electrical lines, at least one transmission station of the one or more transmission stations feeding, into a grid, the electrical energy generated by the one or more wind power installations, the at least one transmission station comprising:
      a line connection connected to the grid,
      a control unit having a casing and configured to regulate feeding of the electrical energy, and
      a lockable housing that houses the line connections, fasteners and the control unit, wherein:
         the housing includes a first room and a second room, the second room having a lead-through opening and being connected to an outside environment by an exhaust pipe that is led through the lead-through opening by a flange,
         the first room and the second room are connected to each other by a joint recess,
         the control unit closes the joint recess, and
         the casing of the unit has at least one of an opening in an area where the recess is closed and a predetermined breaking point that is adapted to fail when an electric arc occurs inside the control unit.

8. The transmission station according to claim 1, wherein the control unit that is configured to regulate feeding of the electrical energy is further configured to transform the electrical energy and feed-in the transformed energy using the line connection.

9. The transmission station according to claim 1, wherein the lockable housing is weather-proof.

10. The transmission station according to claim 1, wherein the flange is a divisible flange.

11. The transmission station according to claim 4, wherein overpressure in the second room causes the backlash element to move from the locked position to the released position, and a force of gravity or a return element causes the backlash element to move from the released position to the locked position.

12. The wind farm according to claim 7, wherein the exhaust pipe is formed by a down pipe with a backlash element, wherein the backlash element is configured to release the down pipe in case of overpressure in the second room.

13. The wind farm according to claim 12, wherein the backlash element is movable back and forth between a locked position and a released position.

14. The wind farm according to claim 12, wherein the backlash element is movable from a locked position to a released position in response to a pressure value being above a threshold value and back to the locked position in response to the pressure value being below the threshold value.

15. The wind farm according to claim 12, wherein the second room is disposed underneath the first room and separated from the first room by a joint wall.

16. The wind farm according to claim 7, wherein the exhaust pipe extends from the second room into the first room through the lead-through opening and the exhaust pipe extends across the first room leaving the first room through a side or ceiling wall of the housing.

17. The wind farm according to claim 7, wherein the control unit that is configured to regulate feeding of the generated electrical energy is further configured to transform the generated electrical energy and feed-in the transformed energy using the line connection.

18. The wind farm according to claim 7, wherein the lockable housing is weather-proof.

19. The wind farm according to claim 7, wherein the flange is a divisible flange.

* * * * *

UNITED STATES PATENT AND TRADEMARK OFFICE
CERTIFICATE OF CORRECTION

| | | |
|---|---|---|
| PATENT NO. | : 9,627,865 B2 | Page 1 of 1 |
| APPLICATION NO. | : 14/443981 | |
| DATED | : April 18, 2017 | |
| INVENTOR(S) | : Holger van Dyk et al. | |

It is certified that error appears in the above-identified patent and that said Letters Patent is hereby corrected as shown below:

In the Claims

Column 5, Line 18:
"energy generated by a wind power installation the transmission"
Should read:
--energy generated by a wind power installation, the transmission--.

Column 5, Line 50:
"valued"
Should read:
--value--.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*